(No Model.)
E. PHILLIPS.
CHUCK.
No. 468,525. Patented Feb. 9, 1892.
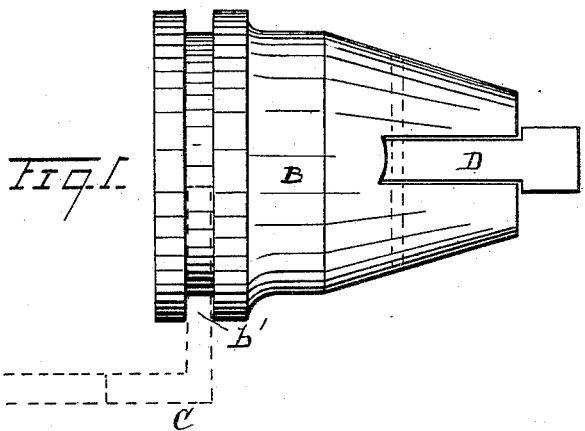
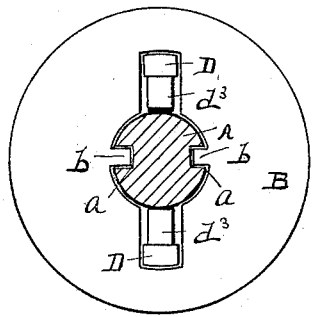
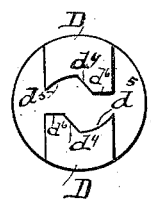
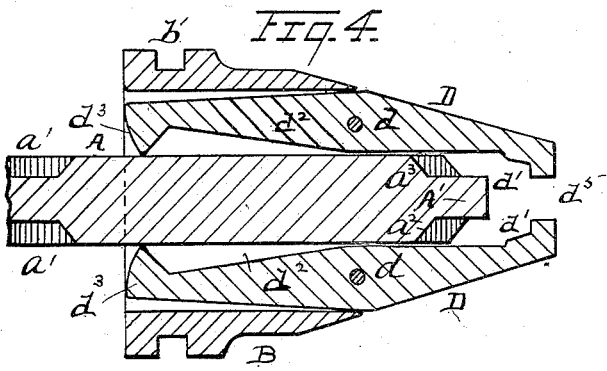
Witnesses
John Schuman
John F. Miller
Inventor
Edward Phillips
By his Attorney
Newell S. Wright

UNITED STATES PATENT OFFICE.

EDWARD PHILLIPS, OF DETROIT, MICHIGAN, ASSIGNOR OF TWO-THIRDS TO EDWARD T. GILBERT AND LOUIS SEVIGNE, OF SAME PLACE.

CHUCK.

SPECIFICATION forming part of Letters Patent No. 468,525, dated February 9, 1892.

Application filed July 20, 1891. Serial No. 400,135. (No model.)

*To all whom it may concern:*

Be it known that I, EDWARD PHILLIPS, a citizen of the United States, residing at Detroit, county of Wayne, State of Michigan, have invented a certain new and useful Improvement in Chucks; and I declare the following to be a full, clear, and exact description of the invention, such as will enable others skilled in the art to which it appertains to make and use the same, reference being had to the accompanying drawings, which form a part of this specification.

My invention relates to a certain new and useful improvement in a chuck, and is more particularly designed to provide a chuck to engage the angular head of a bolt, screw, or analogous implement and hold it firmly while being screw-threaded, pointed, or otherwise operated upon.

My invention is not, however, limited to such a purpose alone, as it is intended to form a chuck to quickly and firmly engage any implement or other work having an angular end or head while the chuck is rotating at whatever angle or in whatever manner the end or head of the work is presented to the chuck. The desirability of such a chuck to readily engage and hold and release the work is evident.

My invention therefore consists of the combinations of devices and appliances hereinafter specified and claimed, and illustrated in the drawings, in which—

Figure 1 is a side elevation of the chuck. Fig. 2 is a rear elevation showing the rotatable shaft in section. Fig. 3 is a front view. Fig. 4 is a vertical longitudinal section.

I carry out my invention as follows: A represents a rotatable shaft. B is a reciprocatory head mounted thereupon and rotatable therewith. To this end the shaft may be recessed, as shown at $a$, and the head be constructed with ribs or tenons $b$, entering the recesses. This construction will prevent the head from turning on the shaft, while allowing it to reciprocate thereupon. The head may be constructed with an annular exterior recess $b'$ at one extremity.

C is any reciprocating carriage or other portion of the machine upon which the chuck is located, engaged with said annular recess or otherwise connected with the head to reciprocate it upon the shaft.

D denotes jaws fulcrumed on the interior of the head, as shown at $d$. Each of the jaws is preferably constructed with an interiorly-beveled face $d'$ toward its forward end, with an angular-shaped recess $d^2$ toward its opposite end, and with a heel $d^3$ at its rear extremity. The shaft is formed with longitudinal grooves $a'$ to receive said heels when the head is reciprocated in that direction, allowing the forward ends of the jaws to open. The forward ends of the jaws are opened by the contact of the forward end of the shaft with the interior beveled faces $d'$ of the jaws as the head is retracted upon the shaft. The forward end of the shaft is also preferably constructed with a projecting point $A'$, adapted to force out the work when it is released from the opened jaws. As the forward ends of the jaws are thus forced open by the retraction of the head upon the shaft, evidently the heels $d^3$ drop into the grooves $a'$ of the shaft, the angular recesses $d^2$ allowing them to do this. When the head is moved forward toward the work, the heels ride out of said grooves upon the straight edge of the shaft, and the forward ends of the jaws are thereby forced toward each other to engage the work. The faces of the shaft coming in contact with the beveled faces $d'$ of the jaws and with the heels as they ride into and out of said grooves are also preferably beveled, as shown at $a^2$ $a^3$. The jaws project beyond the forward end of the head, and their proximal faces are angular or each provided with a flat portion $d^6$, which extends inwardly upon one side, an inwardly-curved surface $d^5$ on the other side, and an inclined straight surface $d^4$, which joins the inner ends of said outer surfaces, the flat portion of one surface being diametrically opposite the curved surface of the other jaw and the inclined surfaces being substantially parallel with each other. This construction of the jaws permits of the article to be held being introduced from either side, as well as from the front, and even though the chuck be rotating at the time. If the chuck be rotating, as soon as the article is engaged by the curved surface of either jaw it is forced inward to the inclined surface, where, in connection with the corresponding surfaces of the opposite jaw, it is held tightly by moving the jaws toward each other. In other words, the inclined and curved surfaces of the jaws really make two substantially V-shaped recesses, one arm or surface of each of which extends from the apex to the outer side of the jaw and the other arm or surface terminates at a point intermediate the apex and the opposite side of the jaw. The angular head or end of the work strikes in one of these openings as the chuck is rotated and is immediately guided toward the center of the jaws and rests upon the opposite angular faces thereof, and is thereby effectually held from turning in the chuck.

The chuck is evidently simple and economical, while also of superior utility.

What I claim as my invention is—

1. In a chuck, the combination of a rotatable shaft, a reciprocatory head mounted thereupon and rotatable therewith, and jaws interiorly fulcrumed within the head, the shaft being adapted to engage with the jaws on both sides of the fulcrum, whereby they will be closed upon the work when the head is reciprocated in one direction and opened to release the work when reciprocated in the opposite direction, substantially as described.

2. In a chuck, the combination of a rotatable shaft, a reciprocatory head mounted thereupon and rotatable therewith, and jaws fulcrumed within the head, said jaws each constructed with an interiorly-beveled face toward its forward end, with an angular recess toward its rear end, and with a heel at its rear extremity, said shaft constructed with recesses to receive said heels, substantially as described.

3. In a chuck, the combination, with a rotatable shaft, of a reciprocatory head mounted thereupon and rotatable therewith and two jaws fulcrumed on the interior of said head, said jaws constructed with angular proximal faces at their forward ends and each formed with a substantially V-shaped recess, one arm or surface of which extends from the apex to the outer side of the jaw and the other arm or surface terminates at a point between the apex and the opposite side of the jaw, substantially as described.

4. In a chuck, a rotatable head and jaws fulcrumed on said head and projecting forward of the head, the forward and projecting ends of said jaws having their proximal faces angular or each provided with a flat portion which extends inwardly from one side, an inwardly-curved surface extending inwardly from the other side, and an inclined surface connecting the inner ends of the outer surfaces, the flat portion of one jaw being diametrically opposite the curved surface of the other jaw and the inclined surfaces being substantially parallel with each other, substantially as described.

In testimony whereof I sign this specification in the presence of two witnesses.

EDWARD PHILLIPS.

Witnesses:
  CHAS. R. SAVILLE,
  H. A. PASSOLT.